(12) United States Patent  
Chavis et al.

(10) Patent No.: US 6,595,681 B2  
(45) Date of Patent: Jul. 22, 2003

(54) QUICK CHANGE LIQUID METERING DEVICE

(75) Inventors: Jimmy D. Chavis, Spartanburg, SC (US); Todd D. Danielson, Moore, SC (US); Frank M. Pitman, Duncan, SC (US)

(73) Assignee: Milliken & Co., Spartanburg, SC (US)

(*) Notice: Subject to any disclaimer, the term of this patent is extended or adjusted under 35 U.S.C. 154(b) by 44 days.

(21) Appl. No.: 10/044,863

(22) Filed: Oct. 22, 2001

(65) Prior Publication Data

US 2002/0114213 A1 Aug. 22, 2002

Related U.S. Application Data

(60) Provisional application No. 60/242,651, filed on Oct. 23, 2000.

(51) Int. Cl.[7] .................................................. B01F 5/04
(52) U.S. Cl. .................................. 366/167.1; 366/181.1
(58) Field of Search ........................... 366/167.1, 181.1; 285/316, 318, 33, 84; 239/600

(56) References Cited

U.S. PATENT DOCUMENTS

| | | | | |
|---|---|---|---|---|
| 2,092,116 A | * | 9/1937 | Hansen | 285/316 |
| 2,344,740 A | * | 3/1944 | Shaff | 285/316 |
| 3,342,193 A | * | 9/1967 | Deering et al. | 366/167.1 |
| 3,385,613 A | * | 5/1968 | McCall | 285/84 |
| 3,554,444 A | * | 1/1971 | Hochman | 239/8 |
| 3,814,388 A | | 6/1974 | Jakob | 259/191 |
| 4,114,195 A | | 9/1978 | Dirksing et al. | 366/167 |
| 4,284,729 A | | 8/1981 | Cross et al. | 521/158 |
| 4,507,407 A | | 3/1985 | Kluger et al. | 521/113 |
| 4,640,690 A | | 2/1987 | Baumgartner et al. | 8/506 |
| 4,691,942 A | * | 9/1987 | Ford | 285/84 |
| 4,715,393 A | * | 12/1987 | Newton | 366/167.1 |
| 4,917,525 A | * | 4/1990 | Duncan | 403/349 |
| 5,116,547 A | | 5/1992 | Tsukahara et al. | 264/1.1 |
| 5,225,210 A | | 7/1993 | Shimoda | 425/145 |
| 5,452,955 A | * | 9/1995 | Lundstrom | 366/167.1 |
| 6,102,999 A | | 8/2000 | Cobb, III et al. | 106/243 |
| 6,127,470 A | | 10/2000 | Cobb, III et al. | 524/367 |

* cited by examiner

Primary Examiner—Tony G. Soohoo  
(74) Attorney, Agent, or Firm—Terry T. Moyer; William S. Parks

(57) ABSTRACT

An improved procedure and apparatus for introducing liquids within a thermoplastic or thermoset production system are provided. Such an inventive apparatus comprises a storage tank for the desired liquid, a device which connects to a flow channel (such as a manifold or pipe) through which the target thermoplastic or thermoset composition is flowing, and a transfer line connecting the storage tank with the connecting device. The connecting device itself easily attaches and detaches to the flow channel through a spring-loaded or sliding-lock mechanism. Such a novel apparatus permits an ease in changeover from one liquid to another without the need for time-consuming cleaning and without complicated shut-off, removal, and replacement steps. Furthermore, such an apparatus allows for quick start-up, a drastic reduction in time required for changeover, and, with the connecting device being attached directly to the flow channel, a reduction in potential clogging through the unwanted misdirection of thermoplastic or thermoset composition into the connecting device and/or transfer line itself. As noted above, the particular procedure for producing such thermoplastic or thermoset compositions through utilization of such an apparatus is encompassed within this invention as well.

10 Claims, 6 Drawing Sheets

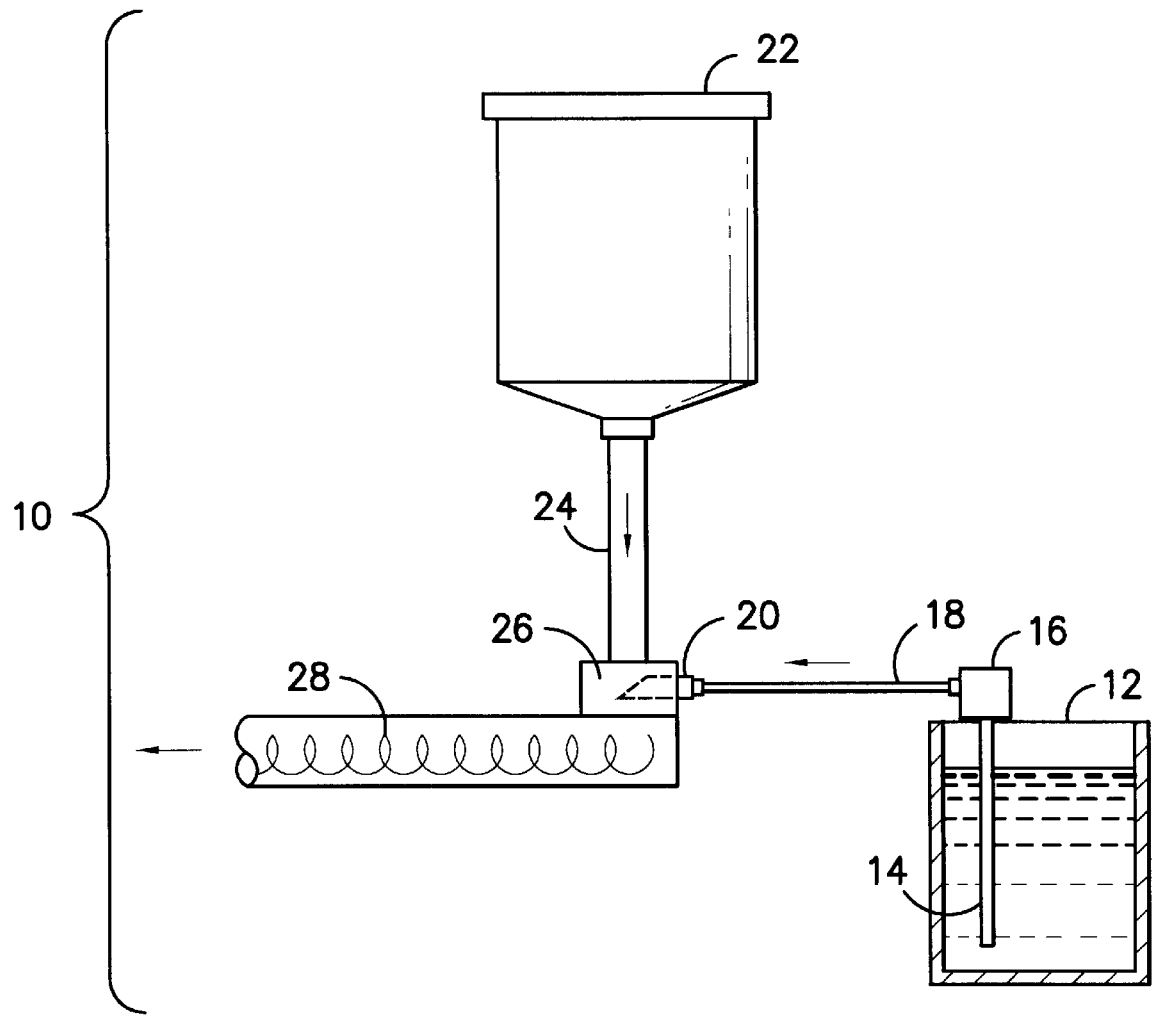
FIG. -1-

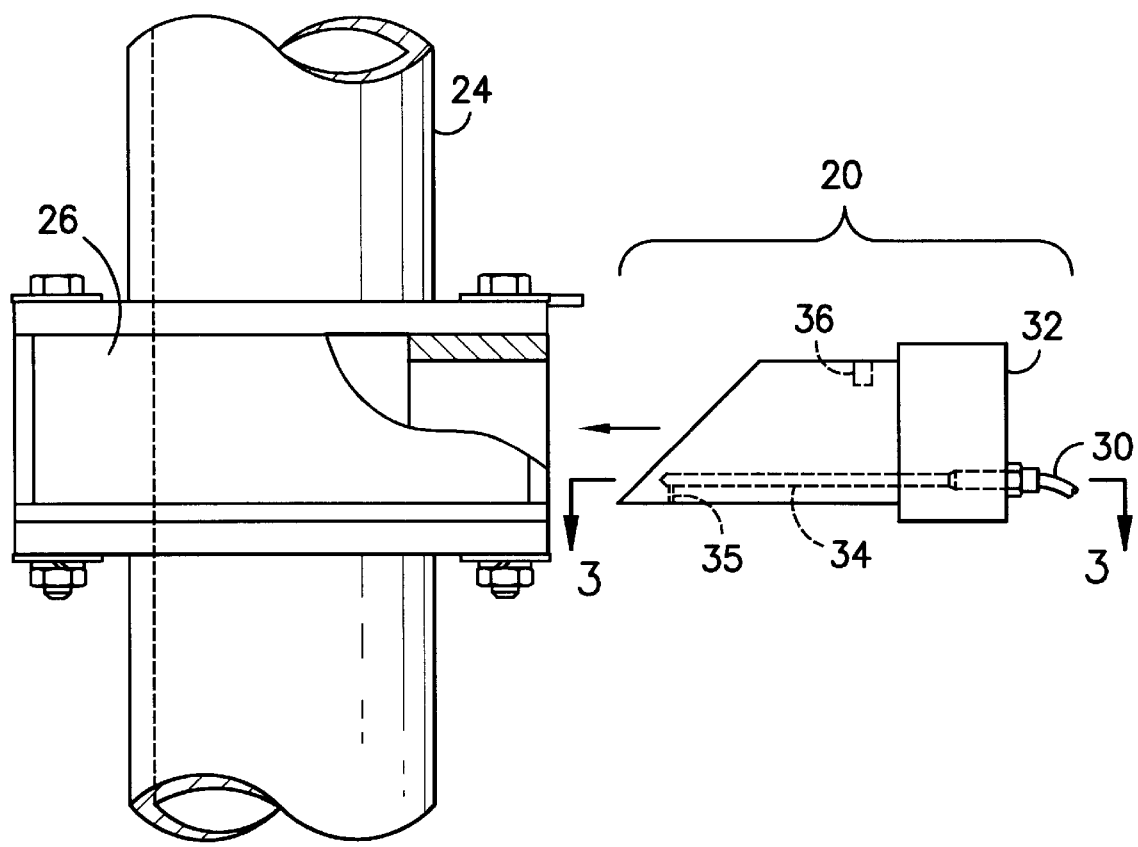
FIG. -2-
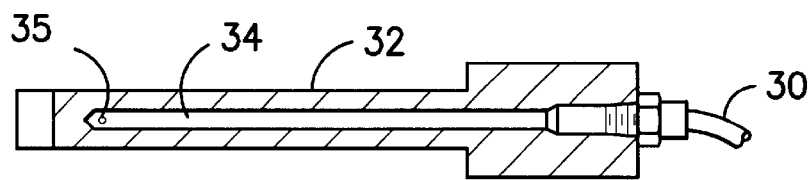
FIG. -3-

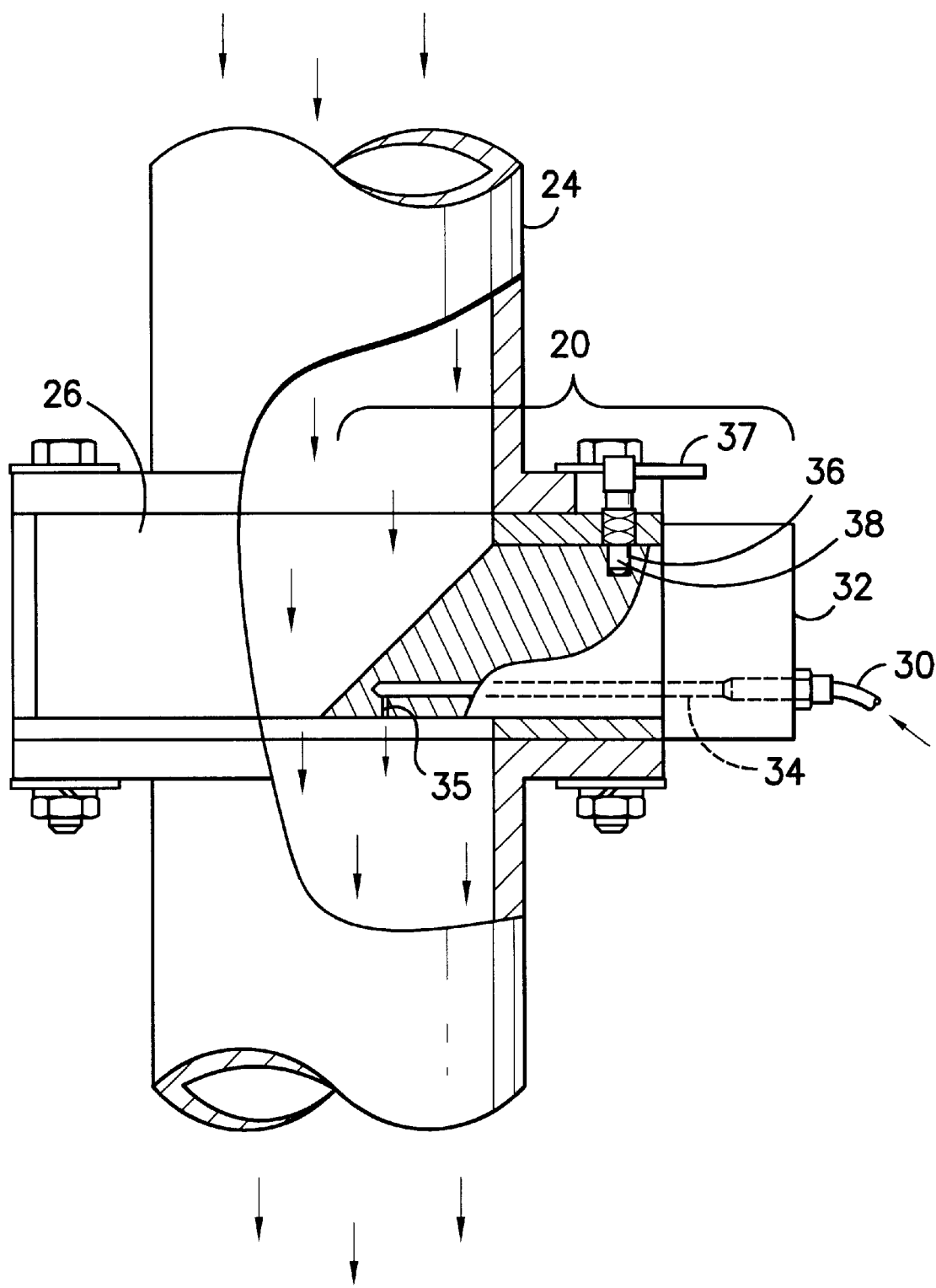
FIG. −4−

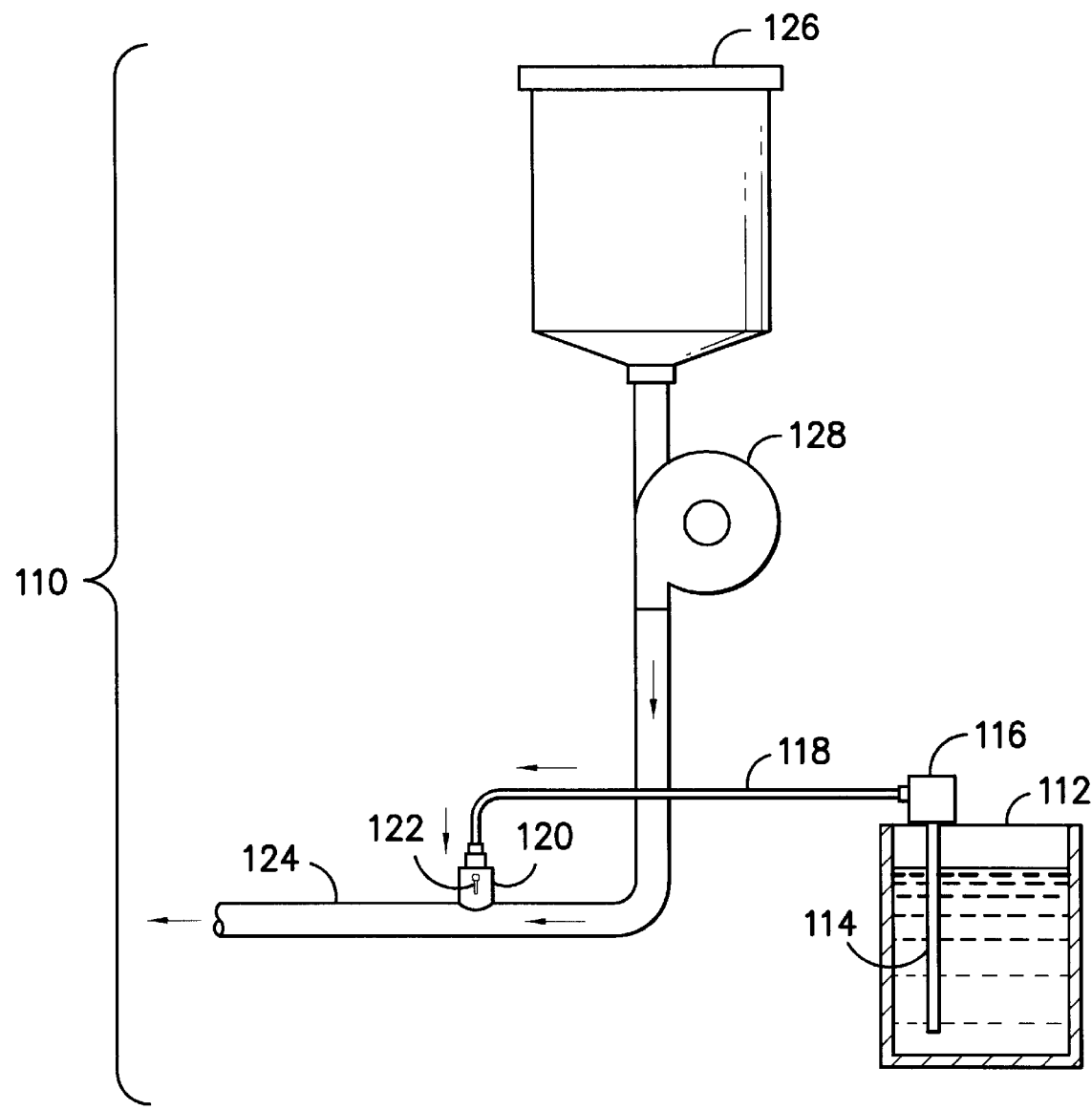
FIG. —5—

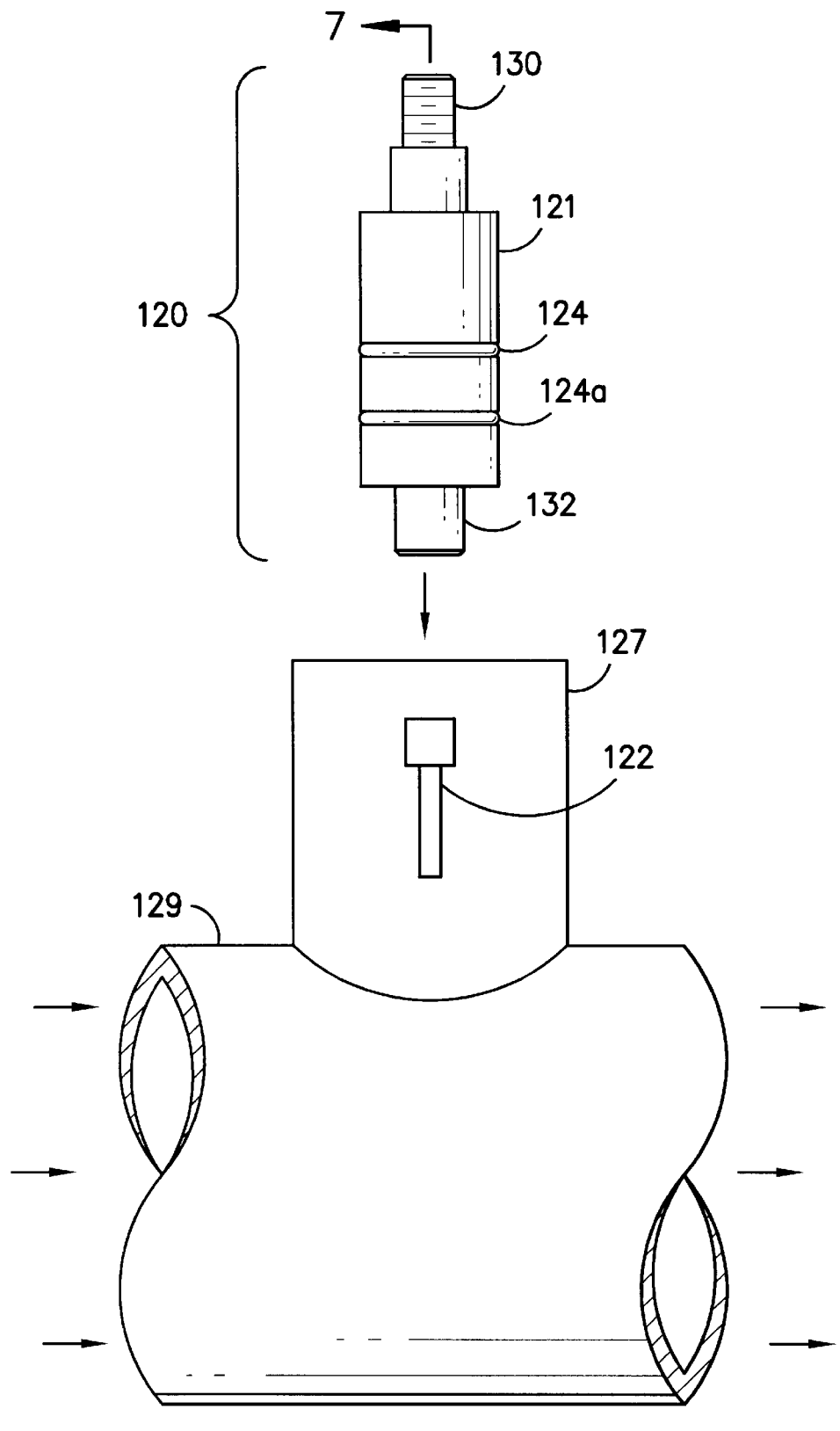
FIG. −6−

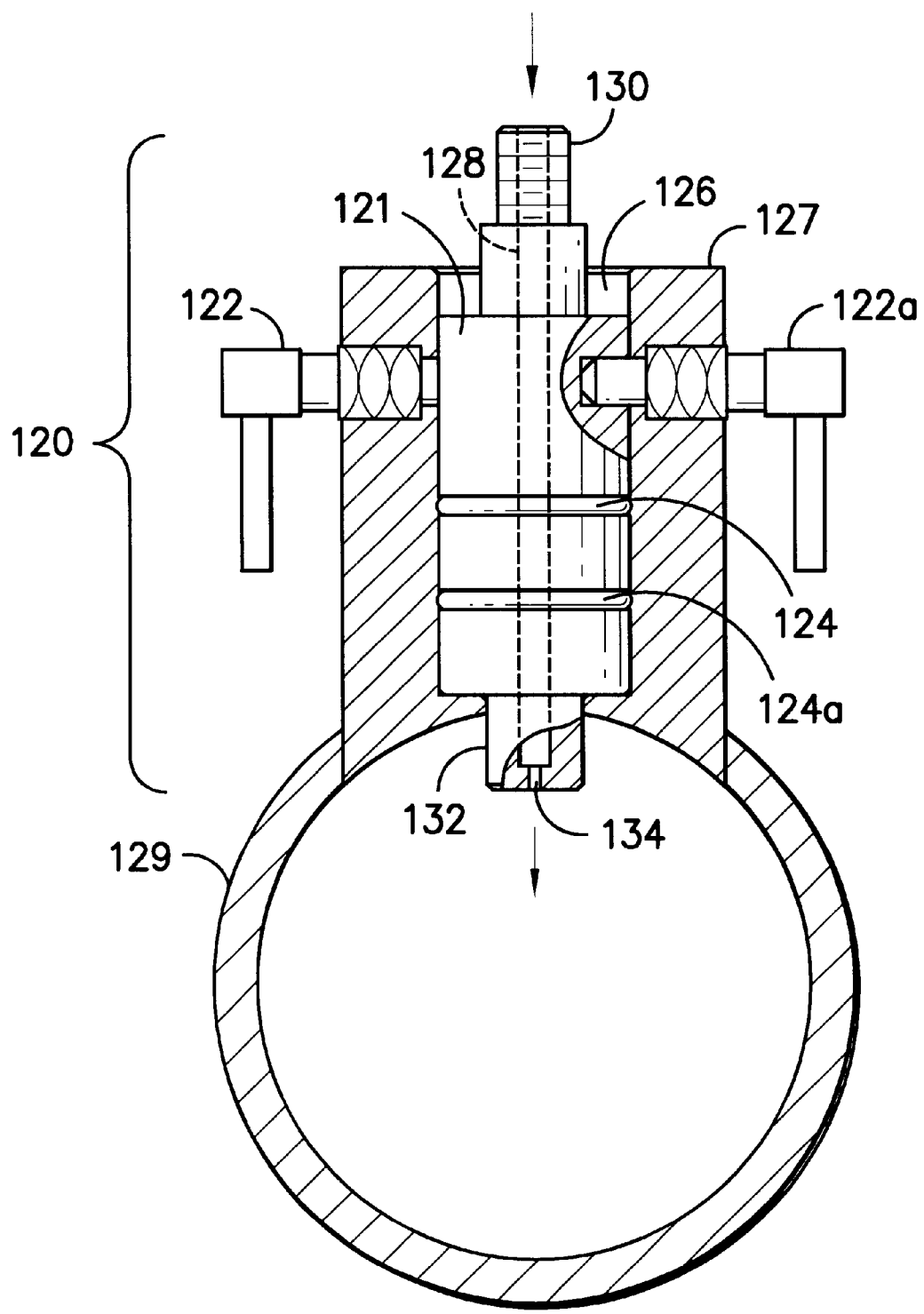
FIG. -7-

QUICK CHANGE LIQUID METERING DEVICE

CROSS REFERENCE TO RELATED APPLICATIONS

This application is based upon U.S. provisional application No. 60/242,651 filed on Oct. 23, 2000.

FIELD OF THE INVENTION

This invention relates to an improved procedure and apparatus for introducing liquids within a thermoplastic or thermoset production system. Such an inventive apparatus comprises a storage tank for the desired liquid, a device which connects to a flow channel (such as a manifold or pipe) through which the target thermoplastic or thermoset composition is flowing, and a transfer line connecting the storage tank with the connecting device. The connecting device itself easily attaches and detaches to the flow channel through a spring-loaded or sliding-lock mechanism. Such a novel apparatus permits an ease in changeover from one liquid to another without the need for time-consuming cleaning and without complicated shut-off, removal, and replacement steps. Furthermore, such an apparatus allows for quick start-up, a drastic reduction in time required for changeover, and, with the connecting device being attached directly to the flow channel, a reduction in potential clogging through the unwanted misdirection of thermoplastic or thermoset composition into the connecting device and/or transfer line itself. As noted above, the particular procedure for producing such thermoplastic or thermoset compositions through utilization of such an apparatus is encompassed within this invention as well.

BACKGROUND OF THE PRIOR ART

Thermoplastic and thermoset products are utilized to provide different articles and for myriad purposes. For instance, polyester thermoplastic articles include soft drink bottles, medicine vials, and the like; polyolefin thermoplastic articles include food containers, films, and the like; polyurethane thermosets include, without limitation, slabstock foams, carpet underlays, surface coatings, and the like. In order to produce such articles, it is necessary to heat-melt the base thermoplastic to a liquid or otherwise process a thermoset into which any number of additives may be present, or, more particularly, incorporated therein. Such additives could include antioxidants, nucleating agents, plasticizers, acid scavengers, brighteners, and, most preferably, coloring agents.

With the desire for certain aesthetic qualities within the marketplace for such products, the addition of colorants within such thermoplastics or thermosets has become commonplace. As noted above, the introduction of such coloring agents within target thermoplastics is generally performed through a pipe (or similar channel) attached simultaneously to both a coloring agent storage tank and the flow channel (pipe, etc.) within which the plastic pellets are transported. Unfortunately, such a configuration has proven difficult in the past, particularly since such apparati are attached through extensive connecting devices (clamps, screws, seals, etc.) to the target plastic flow channel. Furthermore, the feed lines from the coloring agent storage tanks have not been connected adjacent to the flow channel itself; in general, such a connection from the storage tank is present on a separate shunt pipe located on the flow channel itself. Thus, the shunt pipe is the component through which the coloring agent must penultimately travel through prior to introduction within the target plastic within the flow channel. In such a configuration, the shunt pipe is susceptible to clogging, requires cleaning after use (particularly prior to utilization of a different coloring agent through the same shunt pipe), all of which adds inordinate amounts of time to the already time-consuming procedure. As a result, there is a need to provide a liquid metering device for such procedures which foregoes such cleaning requirements, reduces the chances for clogging of coloring agent and/or molten plastic within the feed line itself, and thus, which provides a more efficient manner for changing coloring agents (and other liquid additives) during plastic production. To date, there have been no such specific developments to such a degree within the pertinent thermoplastic or thermoset production industry.

Such an introduction of such coloring agents within such target plastics has, as alluded to above, through rather cumbersome procedures. For instance, such methods of introduction have been met in the past through the utilization and introduction of colorants through one or more pipes or injectors, arranged consecutively and serially (if a plurality is present), through connections (feed lines, etc.) feeding to a manifold, and ultimately onto and/or mixed with pellets or into molten plastic formulations. The pipes or valve assemblies have been disposed in the past by merely creating a hole in the manifold to which the pipe or valve assembly is attached. The colorant would then be fed (by pressure or gravity, for instance) through the pipe or valve assembly and emptied into the pellet or molten plastic stream travelling through the manifold. These colored mixtures are then generally fed to a further mixing vessel or, in the instance where pellets are colored, to a melting vessel (such a heated screw, and the like) and fed to the desired molder, extruder, etc. Such a standard method has proven inefficient and problematic in the past since the utilization of a feeder pipe into the flow channel manifold requires a number of extra, time-consuming procedures upon changeover from one coloring agent to another. For example, the feeder pipe must be cleaned of excess coloring agent; the target plastic (be it in pellet or molten form) may enter such a feeder pipe instead of the flow channel manifold (thereby creating potential clogging, flow, and/or waste problems; and instantaneous shut-off and, more importantly, start-up are nearly impossible to accomplish. Furthermore, the connection between the coloring agent storage tank and the coloring agent feed line (directly attached to the plastic flow channel manifold) is generally made by a rigid or flexible tube which is attached to the feed line, at least, through a cumbersome, rather reliable, device (such as a clamp) wherein the tube is generally larger in diameter than the feed pipeline. Thus, even flow problems and leak possibilities are increased, and in fact, prevalent, with such a standard traditional configuration. Therefore, it is evident that improvements are highly desired within the industry to permit more efficient and effective introduction of liquid additives within thermoplastic or thermoset formulations and articles.

In the past, custom blends of coloring agents, such as polymeric colorants, were prepared prior to use by mixing two or more "primary" colors prior to incorporation within the target plastic. The components would be mixed together using some type of agitator such as a mixer or a drum tumbler. Once the blend was of an appropriate shade it was transferred to a storage tank for further introduction within the foam substrate. Upon completion of coloring with a specific batch of polymeric colorant, the previously run color would have to be emptied from the storage tank; the tank would need to be cleaned; and then the next color to be run in the same tank would have to be charged in the tank. Cleaning of the tanks, feed lines (a.k.a. pipelines), etc., was facilitated due to the water-solubility of the polymeric colorants (particularly as compared to pigments); however, the procedures followed were still considered labor intensive and not cost efficient. The general practice was then modified to maintain a dedicated tank for each separate color (shade) that was to run. This led to a number of inefficiencies and limitations that were not desirable if a foam or thermoplastic manufacturer was to adequately meet demands in the market place.

Polymeric colorants, such as disclosed in U.S. Pat. No. 4,284,729 to Cross et al., herein entirely incorporated by reference, were designed to be totally miscible with one another as well as within most plastic components (such as polyols, one of the two main ingredients used to produce polyurethane materials, isocyanates being the other, for example). Pigment dispersions, on the other hand, are particulates dispersed in some type of liquid carrier. They require a high degree of agitation before they satisfactorily blend together to provide a uniform color. Furthermore, they are generally not water-soluble and thus either difficult to clean from certain surfaces or, alternatively, require the utilization of undesirable organic solvents (methylene chloride, and the like, for example) for removal. Additionally, colorants such as acid dyes, solvent dyes, and the like, are also utilizaed for the coloring of thermoplastics and thermosets which also tend to pose the same general cleaning problems and miscibility difficulties as pigments. However, the inventive metering device may be utilized in conjunction with any of these types of coloring agents for introduction within the target plastic formulations.

Also, the liquids to be introduced within such plastics are not limited to coloring agents (although such compounds are preferred). As a result, any liquid additives added within plastics may be utilized with such an inventive system. Included, without limitation, within the list of additives are clarifying and/or nucleating agents (as in U.S. Pat. Nos. 6,102,999 and 6,127,470 to Cobb, III et al., both herein entirely incorporated by reference), plasticizers, optical brighteners, antioxidants, acid scavengers, and the like.

OBJECTS AND DESCRIPTION OF THE INVENTION

It is thus an object of the invention to provide a new, easy to use, configuration of a liquid metering device for the introduction of liquid additives onto a plastic pellets. As well, such an object includes the introduction of liquid additives into molten plastics with the same easy-to-use device. A further object of the invention is to provide a liquid metering device which drastically reduces the possibility of clogging within a feed pipeline from the liquid storage tank to the target plastic manifold flow channel. Another object of this invention is to provide an easy-to-remove and/or attach feed line for introduction of liquid additives to target plastic formulations within a manifold flow channel.

Procedures for the coloration of plastics is set forth in U.S. Pat. No. 4,640,690, to Baumgartner et al., and U.S. Pat. No. 4,507,407, to Kluger et al., both entirely incorporated herein by reference, in which liquid polymeric colorants are added to the resin before or during compounding and polymeric addition reaction. These patents also provide the same definition and scope of the terms "thermoplastics" and "thermosets" as for the inventive coloring applications. The term "plastic" is herein intended to encompass both thermoplastic and thermoset compositions and articles.

BRIEF DESCRIPTION OF THE DRAWINGS

The accompanying drawings, which are incorporated in and constitute a part of this specification, illustrate several potentially preferred embodiments of the invention and together with the description serve to explain the principles of the invention wherein:

FIG. 1 is a diagram of one particularly preferred configuration and procedure (for feeding into a plastic pellet stream) utilizing an inventive liquid metering device.

FIG. 2 is schematic cross-section (side view) of the attachment point between the manifold flow channel and the injection port of the feed pipeline in unattached relation of one preferred configuration for the inventive liquid metering device.

FIG. 3 is a schematic cross section (aerial view) of the injection port of the feed pipeline in FIG. 2 along line 3.

FIG. 4 is a schematic cross section (side view) of the attachment point between the manifold flow channel and the injection port of the feed pipeline in attached relation of one preferred configuration for the inventive liquid metering device.

FIG. 5 is a diagram of one particularly preferred configuration and procedure [for feeding into a molten plastic or polyol (for polyurethane production) stream] utilizing an inventive liquid metering device.

FIG. 6 is schematic cross-section (side view) of the attachment point between the manifold flow channel and the injection port of the feed pipeline in unattached relation of one preferred configuration for the inventive liquid metering device.

FIG. 7 is a schematic cross section (front view) of the attachment point between the manifold flow channel and the injection port of the feed pipeline in attached relation of one preferred configuration for the inventive liquid metering device.

DETAILED DESCRIPTION OF THE DRAWINGS INCLUDING PREFERRED EMBODIMENTS

As depicted in FIG. 1, a plastic pellet coloring system 10 is provided including a liquid storage tank 12 (in the preferred, though not required embodiment, the storage tank 12 contains liquid coloring agent), a liquid additive feed pipeline 18, a plastic pellet hopper 22, a plastic pellet feed pipeline 24, a pellet/additive mixing vessel 26, and a flow channel manifold 28. Thus, the liquid additive is transported through a drawing pipe 14 (by means of a drawing pump 16, which also functions as a metering pump), into the feed pipeline 18 which is permanently attached to an injection port 20. The injection port 20 is temporarily attached to the mixing vessel 26 by a locking means (preferably a slide or spring lock mechanism, 37 in FIG. 4) and transports the liquid additive in a controlled stream into the pellet stream which moves from the hopper 22 through the pellet feed pipeline 24 into the mixing vessel 26. The hopper may include a mixing means (not illustrated) to prevent clogging of the mouth of the pellet feed pipeline 24. After co-introduction within the mixing vessel 26, the mixture of liquid additive and plastic pellets is then transported to a flow channel manifold 28 in which the entire mixture may be exposed to sufficient heat to melt plastic pellets for further processing and better mixture with the liquid additive. The individual components of the coloring system 10 may be of any resilient material, such as metal or plastic. Preferably, the material is metal, such as steel, titanium, aluminum, and the like (more preferably aluminum) for components, although the feed pipelines 18, 24 are preferably of more flexible material, such as polyvinyl chloride, polyethylene terephthalate, and the like, tubing.

FIG. 2 depicts the mixing vessel 26 with the injection port 20 unattached. The injection port 20 comprises the feed pipeline 30, an injection feed line 34, a solid compartment enclosing the top portion of the injection feed line 32, a solid compartment enclosing the bottom portion of the injection feed line 31, an exit feed 35 (which introduces coloring agent away from the walls of the mixing manifold 26 to permit more thorough mixing of the two different components), and a locking indentation 36. The top solid enclosure 32 is integrally or temporarily attached to the bottom solid enclosure 31 and is "male" configured in a shape in receiving relation to the mixing vessel 26. Upon locking into the locking identation by a spring loaded pin (37, 38 of FIG. 4) the entire enclosure 31, 32 will not move out of the mixing vessel 26. Furthermore, the top solid enclosure 32 is larger in width and height than the bottom solid enclosure 31, all in relation to the width and height of the internal structure of the mixing vessel 26, such that the entire injection port 20 will not be able to be inserted past a certain distance into the mixing vessel 26. This is more specifically depicted in FIG. 4 wherein a locking pin 37, 38 has been inserted into the locking identation 36 after insertion of the injection port 20 into the mixing vessel 26. In such an arrangement, then, the liquid additive is transported into the injection port through the feed pipeline 30, into the injection feed line 34 and out through the exit tube 35 into the mixing vessel 26. The liquid additive then mixes with the plastic pellets moved from the pellet feed line 24 into the mixing vessel 26. FIG. 3 simply shows an aerial view along line 3 of the injection port itself.

As depicted in FIG. 5, a molten plastic or polyol coloring system 110 is provided including a liquid storage tank 112 (in the preferred, though not required embodiment, the storage tank 112 contains liquid coloring agent), a liquid additive feed pipeline 118, a molten plastic or polyol storage tank 126, and a molten plastic or polyol feed pipeline/channel flow mixing vessel manifold 124. Thus, the liquid additive is transported through a drawing pipe 114 (by means of a drawing pump 116, which also functions as a metering pump), into the feed pipeline 118 which is permanently attached to an injection port 120. The injection port 120 is temporarily attached to the mixing manifold 124 by a locking means (preferably a slide or spring lock mechanism, 122) and transports the liquid additive in a controlled stream into the molten plastic or polyol stream which moves from the plastic storage tank 126 through the molten plastic or polyol feed pipeline 124, via a pumping and metering device 128. The molten plastic or polyol feed pipeline 124 is attached (as noted above) temporarily to the injection port 120 to facilitate introduction of the liquid additive into the continuous stream of molten plastic and then further transported for further processing and better mixture with the liquid additive. The individual components of the coloring system 110 may be of any resilient material, such as metal or plastic. Preferably, the material is metal, such as steel, titanium, aluminum, and the like (more preferably aluminum) for components, although the liquid additive feed pipeline 118 is preferably of more flexible material, such as polyvinyl chloride, polyethylene terephthalate, and the like, tubing.

FIG. 6 depicts the mixing manifold 124 with the injection port 120 unattached. The injection port 120 comprises the feed pipeline 130, an injection feed line (128 of FIG. 7), a solid compartment enclosing the top portion of the injection feed line 121, a solid compartment enclosing the bottom portion of the injection feed line 132, an exit feed (137 of FIG. 7), and a locking mechanism 122. To permit effective sealing, and thus more effective transport with minimal leakage, seals 134, 134a are also provided on the outside surface of the solid enclosure 121. The top solid enclosure 121 is integrally or temporarily attached to the bottom solid enclosure 132 wherein the entire enclosure is "male" configured in a shape in receiving relation to the mixing manifold housing 127. The top solid enclosure 121 is larger in diameter than the bottom solid enclosure 132 in order to permit introduction within the mixing manifold housing 127 in a complementarily shaped opening 133 such that the injection port 120 can not be inserted past a certain distance. Upon locking into the locking indentation by a spring loaded pin (122, 122a of FIG. 7) the enclosure 121 will not move out of the mixing vessel 124. This is more specifically depicted in FIG. 7 wherein locking pins 122, 122a have been activated to lock the injection port 120 into place within the mixing manifold housing 127. In such an arrangement, then, the liquid additive is transported into the injection port through the feed pipeline 130, into the injection feed line 138 and out through the exit feed 134 (which directs coloring agent away from the walls of the mixing manifold 124 to permit more through mixing of the two different components) into the mixing manifold 124. The liquid additive then mixes with the molten plastic or polyol.

If desired, then, to utilize a non-coloring or plastic production system, such a configuration (as in 10 in FIG. 1 or 110 in FIG. 5) the injection port (20 in FIG. 1 or FIG. 120 in FIG. 5) may be removed and replaced by a similarly shaped article (not illustrated) with the same locking mechanisms present but without any feed lines attached. The resultant system thus would not feed any liquid additive into the plastic compositions, nor would any plastic be able to transport out through the unused, but filled, mixing manifold (26 of FIG. 4) or mixing manifold housing (127 of FIG. 7).

There are, of course, many alternative embodiments and modifications of the present invention which are intended to be included within the spirit and scope of this invention.

What we claim is:

1. A liquid transport apparatus comprising a manifold having an external surface and an internal surface, and at least one detachable liquid transport insert attached to a transport tube; wherein said mixing vessel comprises an opening therein to receive said at least one detachable liquid transport insert; wherein said apparatus also includes a locking mechanism to attach temporarily but securely said at least one detachable liquid transport insert directly to said mixing vessel, said mechanism comprising a locking pin within said manifold and an indentation within said at least one detachable liquid transport insert, wherein said locking pin is shaped in relation to said indentation such that upon locking, said pin prevents said at least one detachable liquid transport insert from being removed without first removing said pin therefrom; wherein said at least one detachable liquid transport insert and said mixing vessel are configured in such a manner wherein said at least one detachable liquid transport insert is in contact with both the external and internal surfaces of said manifold when said locking mechanism is engaged; wherein said at least one detachable liquid transport insert comprises integrally and internally a hollow portion, which is connected to but not integrally part of said transport tube, through which a liquid may be transported through said at least one detachable liquid transport insert into said manifold when said at least one detachable liquid transport insert is attached to said mixing vessel; wherein said hollow portion has a first opening and a second opening, wherein at least one of said first and second openings is located within said manifold and said second opening is located outside said manifold; wherein said at least one detachable liquid transport insert and said manifold opening are configured in such a manner as to permit receipt of said at least one detachable liquid transport insert within said manifold opening upon insertion of said at least one detachable liquid transport insert within said manifold opening and, upon activation of said locking means, to prevent escape of an appreciable amount of liquid outside of either of said manifold or said at least one detachable liquid transport insert; and wherein at least one detachable liquid transport insert and manifold are configured in such a manner when said locking means is in operation said at least one detachable liquid transport insert extends within said manifold such that any liquid transported from said at least one detachable liquid transport insert into said manifold is directed away from the internal walls of said manifold.

2. The apparatus of claim 1 wherein said detachable liquid transport insert further comprises means for preventing the entry of the entirety of said insert within said manifold upon attachment of said insert to said manifold.

3. The apparatus of claim 1 wherein multiple detachable liquid transport inserts are present, wherein at least one of said inserts may be attached to said manifold at any one time.

4. The apparatus of claim 1 wherein said apparatus further includes a detachable plug insert wherein when said detachable liquid transport insert is detached from said manifold and when said detachable plug insert is attached and locked to said manifold opening, said detachable plug insert prevents issue any liquid material therefrom.

5. The apparatus of claim 2 wherein multiple detachable liquid transport inserts are present, wherein at least one of said inserts may be attached to said manifold at any one time.

6. A liquid transport and mixing apparatus comprising a manifold, a mixing vessel having an external surface and an internal surface, and at least one detachable liquid transport insert attached to a transport tube; wherein said mixing vessel comprises an opening therein to receive said at least one detachable liquid transport insert; wherein said apparatus also includes a locking mechanism to attach temporarily but securely said at least one detachable liquid transport insert directly to said mixing vessel, said mechanism comprising a locking pin within said mixing vessel and an indentation within said at least one detachable liquid transport insert, wherein said locking pin is shaped in relation to said indentation such that upon locking, said pin prevents said at least one detachable liquid transport insert from being removed without first removing said pin therefrom; wherein said at least one detachable liquid transport insert and said mixing vessel are configured in such a manner wherein said at least one detachable liquid transport insert is in contact with both the external and internal surfaces of said mixing vessel when said locking mechanism is engaged; wherein said at least one detachable liquid transport insert comprises integrally and internally a hollow portion, which is connected to but not integrally part of said transport tube, through which a liquid may be transported through said at least one detachable liquid transport insert into said mixing vessel when said at least one detachable liquid transport insert is attached to said mixing vessel; wherein said hollow portion has a first opening and a second opening, wherein at least one of said first and second openings is located within said mixing vessel and said second opening is located outside said mixing vessel; wherein said at least one detachable liquid transport insert and said mixing vessel opening are configured in such a manner as to permit receipt of said at least one detachable liquid transport insert within said mixing vessel opening upon insertion of said at least one detachable liquid transport insert within said mixing vessel opening and, upon activation of said locking means, to prevent escape of an appreciable amount of liquid outside of either of said mixing vessel or said at least one detachable liquid transport insert; and wherein at least one detachable liquid transport insert and mixing vessel are configured in such a manner when said locking means is in operation said at least one detachable liquid transport insert extends within said mixing vessel such that any liquid transported from said at least one detachable liquid transport insert into said mixing vessel is directed away from the internal walls of said mixing vessel.

7. The apparatus of claim 6 wherein said detachable liquid transport insert further comprises means for preventing the entry of the entirety of said insert within said mixing vessel upon attachment of said insert to said mixing vessel.

8. The apparatus of claim 7 wherein multiple detachable liquid transport inserts are present, wherein at least one of said inserts may be attached to said mixing vessel at any one time.

9. The apparatus of claim 6 wherein multiple detachable liquid transport inserts are present, wherein at least one of said inserts may be attached to said mixing vessel at any one time.

10. The apparatus of claim 6 wherein said apparatus further includes a detachable plug insert wherein when said detachable liquid transport insert is detached from said mixing vessel and when said detachable plug insert is attached and locked to said mixing vessel opening, said detachable plug insert prevents issue any liquid material therefrom.

* * * * *